United States Patent
Sahiri et al.

(10) Patent No.: US 11,892,394 B2
(45) Date of Patent: Feb. 6, 2024

(54) DEVICE FOR A LIGHT SPECTROSCOPIC ANALYSIS

(71) Applicant: Implen GmbH, Munich (DE)

(72) Inventors: Thomas Sahiri, Calabasas, CA (US); Stephan Kapfinger, Augsburg (DE)

(73) Assignee: Implen GmbH, Munich (DE)

( * ) Notice: Subject to any disclaimer, the term of this patent is extended or adjusted under 35 U.S.C. 154(b) by 0 days.

(21) Appl. No.: 17/045,750

(22) PCT Filed: Feb. 4, 2020

(86) PCT No.: PCT/EP2020/052689
§ 371 (c)(1),
(2) Date: Oct. 6, 2020

(87) PCT Pub. No.: WO2020/161108
PCT Pub. Date: Aug. 13, 2020

(65) Prior Publication Data
US 2021/0055205 A1 Feb. 25, 2021

(30) Foreign Application Priority Data

Feb. 5, 2019 (DE) ............... 10 2019 201 440.2

(51) Int. Cl.
| | |
|---|---|
| *G01N 21/03* | (2006.01) |
| *G01N 21/62* | (2006.01) |
| *G01N 21/64* | (2006.01) |
| *G01J 3/02* | (2006.01) |

(52) U.S. Cl.
CPC ........ *G01N 21/0303* (2013.01); *G01J 3/0291* (2013.01); *G01N 21/031* (2013.01); *G01N 21/64* (2013.01); *G01N 21/6428* (2013.01); *G01N 2021/035* (2013.01)

(58) Field of Classification Search
None
See application file for complete search history.

(56) References Cited

U.S. PATENT DOCUMENTS

| | | | | |
|---|---|---|---|---|
| 3,852,604 | A * | 12/1974 | Grengg ........... | G01N 30/00 436/164 |
| 4,678,326 | A * | 7/1987 | Harjunmaa ........ | G01N 21/255 356/417 |
| 4,818,710 | A * | 4/1989 | Sutherland ........ | G01N 21/648 436/805 |

(Continued)

FOREIGN PATENT DOCUMENTS

| | | |
|---|---|---|
| CN | 1432804 A | 7/2003 |
| CN | 1820192 A | 8/2006 |

(Continued)

OTHER PUBLICATIONS

PCT/EP20/52689 filed Feb. 4, 2020 International Search Report and Written Opinion dated May 12, 2020.

*Primary Examiner* — Neil N Turk
(74) *Attorney, Agent, or Firm* — Rutan & Tucker LLP (57) ABSTRACT

The present invention relates to a device for a light-spectroscopic analysis of a sample, wherein said sample is, for example, a liquid sample. Said sample can be detected and/or analyzed photometrically, spectrophotometrically, fluorometrically, spectrofluorometrically and/or with the aid of phosphorescence or luminescence by means of such a device.

40 Claims, 7 Drawing Sheets

(56) References Cited

U.S. PATENT DOCUMENTS

| | | | |
|---|---|---|---|
| 5,963,332 A | 10/1999 | Feldman et al. | |
| 7,265,839 B1 | 9/2007 | Tiwald | |
| 8,838,195 B2 * | 9/2014 | Markle | A61B 5/7203 |
| | | | 600/316 |
| 9,599,569 B2 * | 3/2017 | Tiwald | G02B 1/11 |
| 2003/0127609 A1 * | 7/2003 | El-Hage | G01N 21/6452 |
| | | | 250/574 |
| 2003/0133107 A1 | 7/2003 | Saito et al. | |
| 2005/0110989 A1 * | 5/2005 | Schermer | G01N 21/553 |
| | | | 356/246 |
| 2006/0109465 A1 | 5/2006 | Fukuzawa et al. | |
| 2007/0115468 A1 | 5/2007 | Barnard | |
| 2008/0204755 A1 * | 8/2008 | Sahiri | G01N 21/0303 |
| | | | 356/440 |
| 2010/0045980 A1 * | 2/2010 | Tsukuda | G01N 21/251 |
| | | | 356/319 |
| 2013/0228710 A1 * | 9/2013 | Pfeifer | G01N 21/17 |
| | | | 250/576 |
| 2016/0178509 A1 | 6/2016 | Carter et al. | |
| 2018/0313758 A1 * | 11/2018 | Hsieh | G01N 21/51 |

FOREIGN PATENT DOCUMENTS

| | | |
|---|---|---|
| CN | 1967224 A | 5/2007 |
| CN | 101228431 A | 7/2008 |
| DE | 2656417 A1 | 7/1977 |
| DE | 10351160 B3 | 3/2005 |
| DE | 102005036898 A1 | 2/2007 |
| DE | 102013224847 B3 | 3/2015 |
| EP | 0266881 A2 | 5/1988 |
| TW | 201433785 A | 9/2014 |
| WO | 2005047869 A1 | 5/2005 |

\* cited by examiner

DEVICE FOR A LIGHT SPECTROSCOPIC ANALYSIS

PRIORITY

This application is a U.S. national stage application of International Application No. PCT/EP2020/052689, filed Feb. 4, 2020, which is incorporated by reference in its entirety into this application.

TECHNICAL FIELD

The present invention relates to a device for a light-spectroscopic analysis of a sample, wherein said sample can be, for example, a liquid sample. Said sample can be detected and/or analyzed photometrically, spectrophotometrically, fluorometrically, spectrofluorometrically and/or with the aid of phosphorescence or luminescence by means of such a device.

PRIOR ART

Devices for light-spectroscopic analysis are known in the prior art. In a spectrometer, reflections occur at interfaces of transmitting components that are in the beam path. Such components are, for example, the filter, the detector lens and the sensor window.

This leads to the problem that light beams that are reflected multiple times between the components in the beam path are redirected toward the detector. Since the incidence of light is generally not perpendicular to these elements, the reflections hit areas of the sensor that lie in different positions than the actual signal. The problem also arises that light beams of the excitation light, which are reflected on the components in the beam path but do not reach the sample, are directed toward the detector. These phenomena are also known as "ghost image".

Optical elements between the excitation/detection and the sample are particularly critical for the formation of scattered light. At each transition (interface), a part of the excitation light is reflected and is able to reach the detection fiber. Light is also reflected on a window of the sample chamber to which the liquid sample is applied.

It is therefore generally advantageous to keep the number of optical components to a minimum in order to reduce the number of possible reflection surfaces. One possibility is to use a lens that focuses the light from the excitation fiber or into the detection fiber also as a window of the sample chamber. However, this design has the disadvantage that a measuring head, which includes the excitation and detection fiber as well as the focusing lens, must be rigidly connected to the sample chamber.

Subject Matter of the Invention

An object of the invention is to provide a compactly designed device which at least partially solves the aforementioned problem and thus enables a higher-quality measurement result with a flexible range of applications.

The subject matter of claim 1 provides such a device. Other preferred embodiments are presented in the dependent claims.

The invention aims to separate the measuring head from the sample support, while avoiding additional reflection-induced scattered light. This is achieved by a device for a light-spectroscopic analysis according to claim 1. Preferred embodiments are defined in the dependent claims.

A device for a light-spectroscopic analysis is provided, which comprises: a sample holder with a sample receiving surface for receiving a sample, in particular a liquid sample, and a measuring head for emitting excitation light toward the sample and receiving signal light from the sample. The device is characterized in that the sample holder has a surface facing the measuring head, which lies on the opposite side to the sample receiving surface and whose normal forms a first angle $\alpha$ ($\alpha > 0°$) with an optical axis of the measuring head. This angle can preferably be 2° to 75°, more preferably 4° to 10°, and particularly preferably essentially 6°.

Due to the targeted inclination of the normal of the surface of the sample holder facing the measuring head with respect to the optical axis of the measuring head, i.e. a targeted deviation from the known "parallel" alignment of the optical interfaces, it is possible to separate the optical path of the scattered light, i.e. that part of the excitation light which is scattered or reflected on the optical surfaces without interacting with the sample, from the optical path of the signal light, i.e. that part of the excitation light which has interacted with the sample, to such an extent that the ratio of detected scattered light to detected signal light is effectively reduced, or, in other words, less scattered light falls on the detector.

The measuring head may preferably have a lens, for example a plano-convex lens. Since the lens surface of the measuring head does not have to serve as a sample support, the measuring head including the lens surface can be oriented so that the curved surface of the lens points toward the sample holder. In this case, the excitation light exiting the excitation fiber meets the flat side of the lens as the entry face. This suppresses the scattered light on the flat side of the lens if the distance from the lens to the excitation/detection pupils (e.g. the fiber ends) is selected so small that the reflection of the excitation light exiting the excitation pupil on the flat side of the lens falls between the pupils, i.e. does not reach the detection pupil. This would not be possible if the convex side of the lens were to face the pupils (fiber ends), as the focal length of the lens then determines the distance.

As a result, although a potential reflection surface has been added to the sample holder, only two scattered-light-relevant interfaces remain between the excitation/detection pupils (or the corresponding fiber ends) and sample. Due to the inclination, according to the invention, of the normal of the surface facing the measuring head and lying on the opposite side to the sample receiving surface by the angle $\alpha$ in relation to the optical axis of the measuring head, the reflection on the side of the sample holder facing the measuring head is deviated in such a way that the scattered light produced on this surface does not enter the detection light path.

To hold a sample, instead of a conventional plane-parallel sample holder (e.g. a planar window of a sample chamber), as used in the prior art, it may be preferable to use a sample holder whose surface on the opposite side to the sample receiving surface and facing the measuring head forms a second angle $\beta$ ($\beta > 0°$) with the sample receiving surface. In particular, the sample holder can be a prism or have a wedge-shaped cross section. According to the invention, the reflection on the side of the prism facing the measuring head is deviated due to the aforementioned angle, so that the scattered light produced on this surface does not reach the detection fiber, with it still being possible, however, to mount the sample holder, due to its wedge shape, in such a way that the sample receiving surface remains horizontally aligned and the sample (for example a drop of liquid) can thus be held on the holder without difficulty.

According to a preferred embodiment, the device includes a mirror which is at a defined distance from the sample receiving surface and on which light passing through the sample holder is reflected. Due to reflection of the excitation light, it passes through the sample twice, thus doubling the desired signal light. Furthermore, the sample is held securely between the mirror and the sample receiving surface. The device can also be designed compactly, since the excitation light and signal light are supplied and discharged on the same side of the sample holder.

In a further embodiment, this mirror can be wedge-shaped when viewed in cross section. In this case, it is expedient that the surface of the mirror facing the sample holder is parallel to the sample receiving surface.

Since the holder according to the invention (in particular if it is designed as a prism) not only deviates the reflection but also deflects the transmitted signal light, the measuring head can also be inclined with respect to the mirror by an angle that compensates for the deflection of the beam. This ensures that the transmission of the signal, i.e. the coupling of the signal into the detection fiber, is not affected by the prism.

It is preferable that the angle $\beta$ by which the surface on the opposite side to the sample receiving surface and facing the measuring head is inclined with respect to the sample receiving surface is in the range from 2° to 45°, preferably in the range from 3° to 7°, particularly preferably essentially 5°. This angle (range) can also be referred to as a wedge angle. The angular range has proven to be particularly advantageous in preventing or reducing the detection of scattered light.

A further embodiment provides that the optical axis of the measuring head forms a third angle $\gamma$ in the range of 1° to 30°, preferably 1° to 3°, and particularly preferably essentially 1°, with a normal of the receiving surface of the sample holder. This method also significantly reduces the detection of scattered light and thus significantly increases the quality of the detection result.

Here, a difference between a fourth angle $\delta$ of the normal of the mirror and a third angle $\gamma$ of the optical axis of the measuring head, in each case measured relative to a normal of the receiving surface, can be in the range of 2° to 30°, preferably 2° to 4°, and particularly preferably essentially 2°. This angular range has proven to be particularly advantageous in preventing the measurement result from being adversely affected by scattered light.

The measuring head can be positioned below the holder when viewed vertically, so that a (liquid) sample can be safely applied to a sample holder and subsequently analyzed.

An excitation fiber and a detection fiber can be coupled to the measuring head, excitation light being supplied by the excitation fiber, which reaches the detection fiber after irradiating the sample holder. This allows the device to have a compact design.

In a preferred embodiment, the measuring head can be moved in a plane parallel to the sample receiving surface. The measuring head can also be adjusted preferably along its optical axis, for example for focusing. In this way, it is possible to apply a plurality of samples to the sample holder, which can be detected and analyzed by moving the measuring head.

It is preferred that the device includes a spectrometer, in particular a fluorescence spectrometer or a luminescence spectrometer. This ensures high-quality analysis of a sample.

A further embodiment provides for a plurality of sample holders with a sample receiving surface for receiving a sample, in particular a liquid sample, and one or more movable measuring heads for emitting excitation light toward the sample and receiving signal light from the sample. The measuring head(s) is/are preferably movable in a plane parallel to the sample receiving surface. This design allows a plurality of samples to be detected and analyzed accordingly with one measuring head, while a plurality of measuring heads allow a plurality of samples to be detected and analyzed simultaneously, thus increasing productivity. The measuring head(s) is/are preferably adjustable along its/their optical axis, for example for focusing.

The device may comprise a light source for providing the excitation light for the measuring head, it being preferred that the light source comprises a xenon lamp, in particular a xenon flash lamp. This ensures extremely high-quality analysis.

The invention further concerns the use of a device according to one of the preceding claims for the light-spectroscopic analysis of one or more, in particular liquid, samples, which is/are provided on the sample holder or a plurality of sample holders.

During use, a liquid sample can be applied to the sample holder and detected with the measuring head. The resulting signal light can be further analyzed and evaluated with a spectrometer, for example.

DETAILED DESCRIPTION OF THE PREFERRED EMBODIMENTS

Preferred embodiments are described below on the basis of the attached figures, and the advantages of the invention are explained in detail on the basis of measurement results. Although the embodiments are to be understood as exemplary and not restrictive, individual features can also be used to specify the invention.

Figure 1:
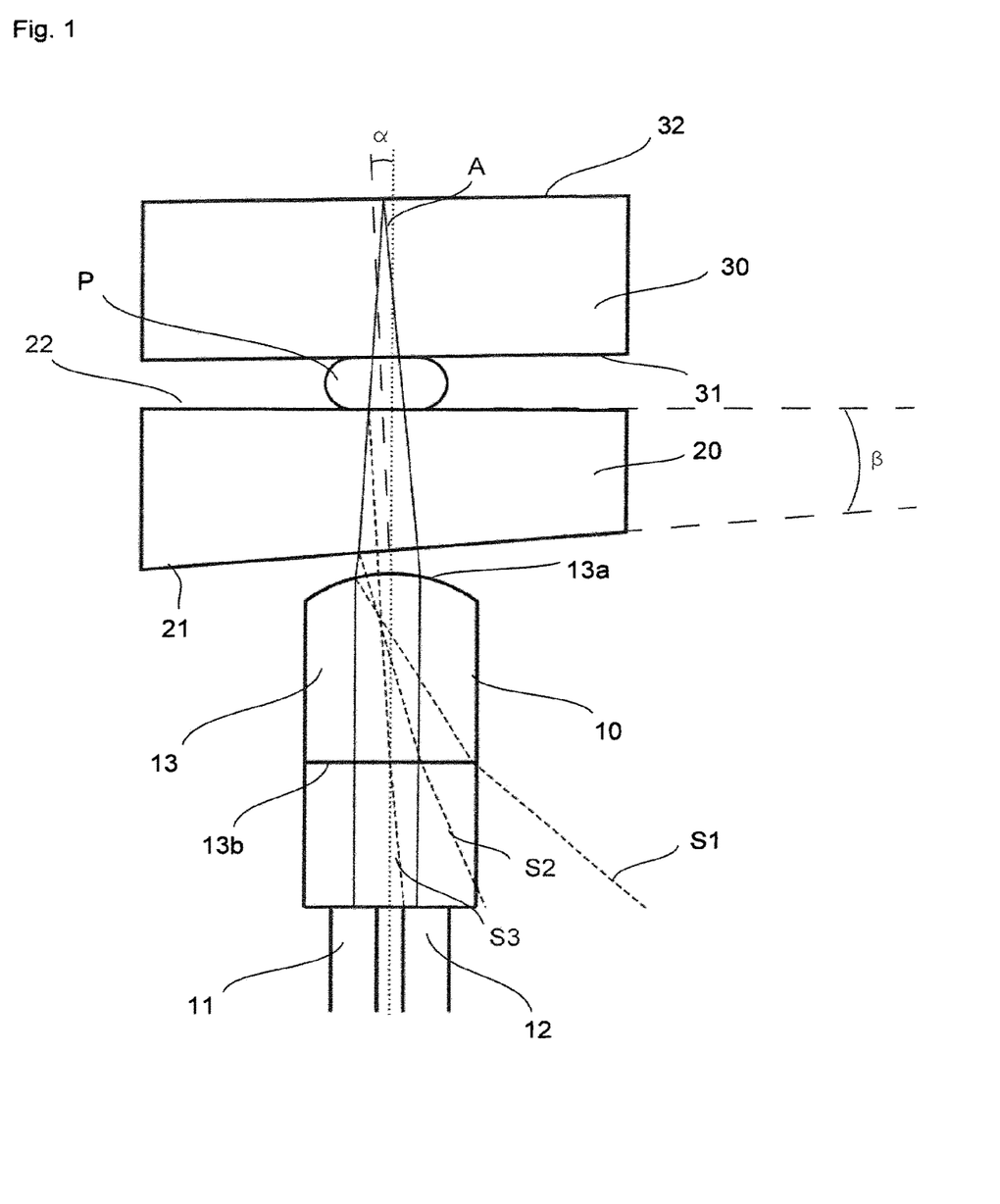
FIG. 1 shows a schematic view of a measuring head of a device for a light-spectroscopic analysis according to a first embodiment of the invention.

FIG. 1 shows a basic structure of a device for a light-spectroscopic analysis according to a first embodiment. In particular, a measuring head 10 is provided, which is designed with an excitation fiber 11, a detection fiber 12 and a lens 13. The lens 13 has a curved, especially convex, lens surface 13a, through which excitation light exits the measuring head 10 toward the sample P. The excitation fiber 11 and the detection fiber 12 are here shown at a distance from the flat entry face 13b, but can also be directly coupled to the flat entry face of the lens if required.

It is also conceivable to direct the excitation light or the light to be detected into or out of the measuring head, in this case the lens 13, without optical fibers, for example by means of light deflectors such as mirrors or prisms, which are arranged in suitable positions under the measuring head/lens 13 and deflect the excitation light from the light source to the measuring head/lens 13 or the light to be analyzed from the lens 13 to the detector.

The lens 13 defines an optical axis A, which in this embodiment example passes through the sample P, in particular its center. Excitation light is supplied by the excitation fiber 11, which, after irradiating the sample P, reaches the detection fiber 12. The detection fiber 12 is connected to a spectrometer, in particular a fluorescence spectrometer or a luminescence spectrometer, with which a spectrophotometric analysis can be carried out.

The excitation fiber 11 is connected to a light source, wherein the light source can be a xenon lamp, in particular a xenon flash lamp, or a laser, for example.

In the first embodiment shown in FIG. 1, the measuring head 10 is disposed below a sample holder 20 (also called "holder"). The sample holder 20 has an inclined surface 21 facing the lens surface 13a, whose normal forms an angle with the optical axis A of the lens 13, and a receiving surface 22, which in this embodiment example has a normal parallel to the optical axis A. The inclined surface 21 has an angle of approximately 5° with respect to the plane of the receiving surface 22. The receiving surface 22 is adapted to receive a liquid sample P and to hold it within a defined area.

On the side of the sample holder 20 opposite to the measuring head 10, a mirror 30 with an entry face 31 is disposed which reflects light emitted by the measuring head 10 back to the measuring head 10. The mirror can be inclined relative to the axis A in the range of 0-1° relative to the plane of the receiving surface 22.

The sample P, in this example a drop of liquid, is held here between the entry face 31 of the mirror 30 and the receiving surface 22 of the sample holder 20, for example by utilizing its surface tension. The excitation light emitted by the excitation fiber 11 passes through the lens 13 and exits the measuring head 10 at the lens surface 13a. A portion of the excitation light is reflected back at the interface of the lens surface 13a. This scattered light portion is referred to as scattered light S1. The scattered light S1 essentially exits the measuring head 10 in such a way that the scattered light S1 does not reach the detection fiber.

A portion of the light passing through the lens surface 13a is reflected on the inclined surface 21 of the holder. This scattered light portion is called scattered light S2. The scattered light S2 essentially does not reach the detection fiber 12 and is therefore not detected.

The portion of the excitation light entering the holder 20 is transmitted to the sample P, the light exiting the holder 20 at the receiving surface 22 being partially reflected. The reflected light portion is referred to as scattered light S3. Most of the scattered light S3 reaches the detection fiber 12 and is thus also detected. In view of the transition from glass to water at the receiving surface 22, which represents an interface, the strength of the reflection is significantly reduced compared to a glass-to-air transition. For this reason alone, the influence of the scattered light S3 is quite low.

The portion of the excitation light that is transmitted to the sample P passes through the sample (wherein the sample is excited) and is subsequently reflected on the mirror 30. The reflected light passes again through the sample P (re-excitation) and through the holder 20, and is coupled into the lens 13. From the lens 13, the light reaches the detection fiber 12 and can be routed from there to a spectrometer.

In a preferred embodiment not shown here, the sample holder 20 is equipped with several sample receiving points spaced perpendicular to the plane of the figure. A sample P can therefore be placed at each of these sample receiving points. The measuring head 10 can be moved accordingly in a plane parallel to the sample receiving surface 22, in particular in a direction perpendicular to the plane of the figure. In this way, a plurality of samples can be run serially one after the other. In a further variant, a plurality of measuring heads 10 can be provided so that a plurality of samples can be detected and analyzed simultaneously.

Figure 2:
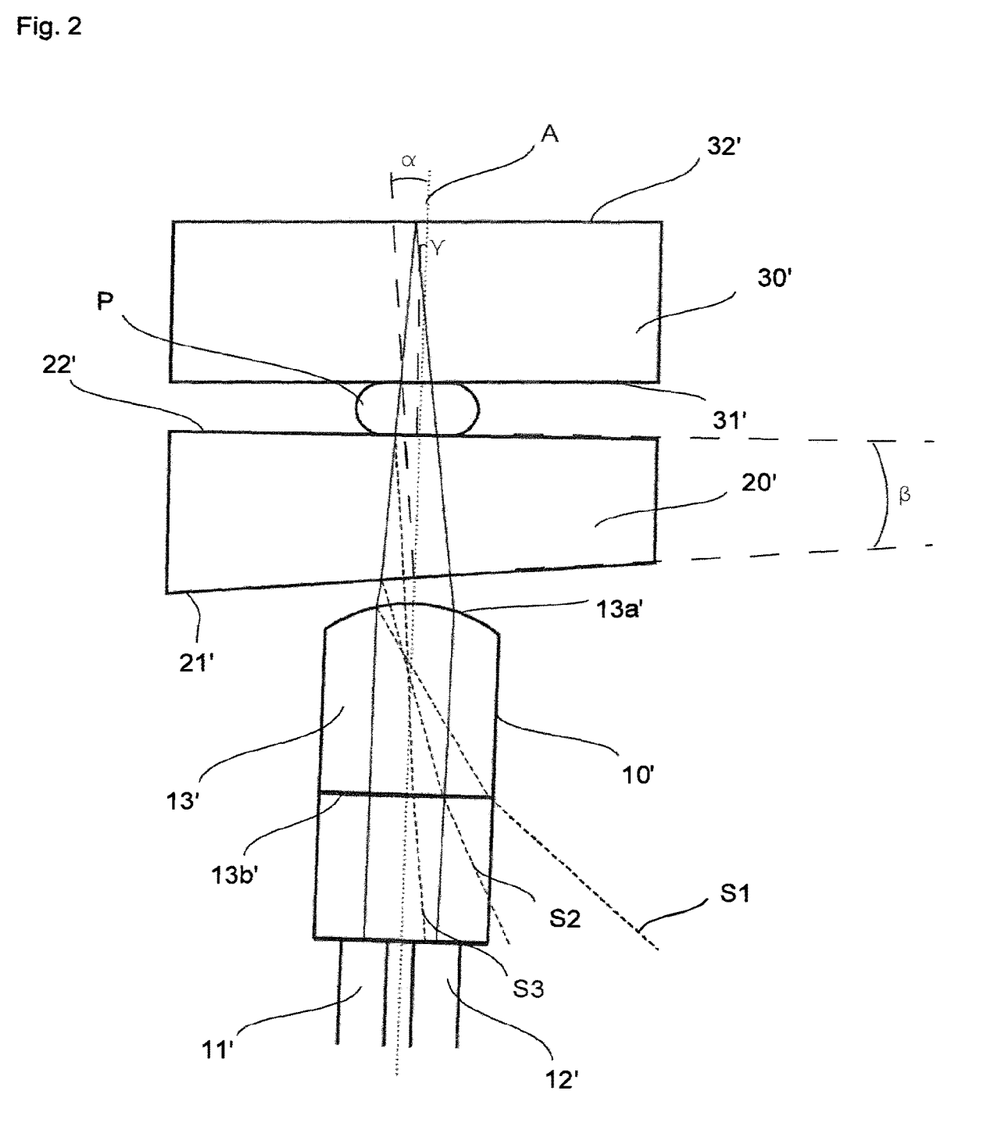
FIG. 2 shows a schematic view of a measuring head of a device for a light-spectroscopic analysis according to a second embodiment of the invention.

FIG. 2 shows a schematic side view of the device according to the second embodiment of the invention. The same reference numbers are used for the corresponding components. The design of the second embodiment essentially differs in the alignment of the measuring head 10.

The optical axis A of the measuring head 10 in the embodiment is inclined at an angle of approximately −1° relative to a normal of the receiving surface 22' of the holder 20'. The light emitted by the measuring head 10' subsequently meets a wedge-shaped sample holder 20'. The inclined surface 21' has an angle of approximately 5° with respect to the sample receiving surface 22'. The mirror 30 can further be inclined relative to the optical axis A in the range of 0-1° relative to the plane of the receiving surface 22.

The excitation light emitted by the excitation fiber 11' passes through the entry face 13b' of the lens, traverses the lens and exits the measuring head 10' at the convex lens surface 13a'. A portion of the excitation light is reflected back at the interface of the lens surface 13a'. This scattered light portion is referred to as scattered light S1. The scattered light S1 essentially exits the measuring head 10' in such a way that the scattered light S1 does not reach the detection fiber.

A portion of the transmitted excitation light is partially reflected on the inclined surface 21' of the holder 20'. This scattered light portion is called scattered light S2. This does not reach the detection fiber 12' and is therefore not detected.

A further scattering of the excitation light occurs at the receiving surface 22'. A corresponding scattered light portion is referred to as scattered light S3. Most of the scattered light S3 reaches the detection fiber 12'. In view of the transition from glass to water at the receiving surface 22" which represents an interface, the strength of the reflection is significantly reduced compared to a glass-to-air transition. For this reason alone, the influence of the scattered light S3 is quite low.

The portion of the excitation light exiting the holder 20' is transmitted to the sample P and subsequently reflected on the mirror 30'. The reflected light passes again through the sample P and the holder 20', and is coupled into the lens 13'. From the lens 13', the light reaches the detection fiber 12' and can be routed from there to a spectrometer.

Figure 3:
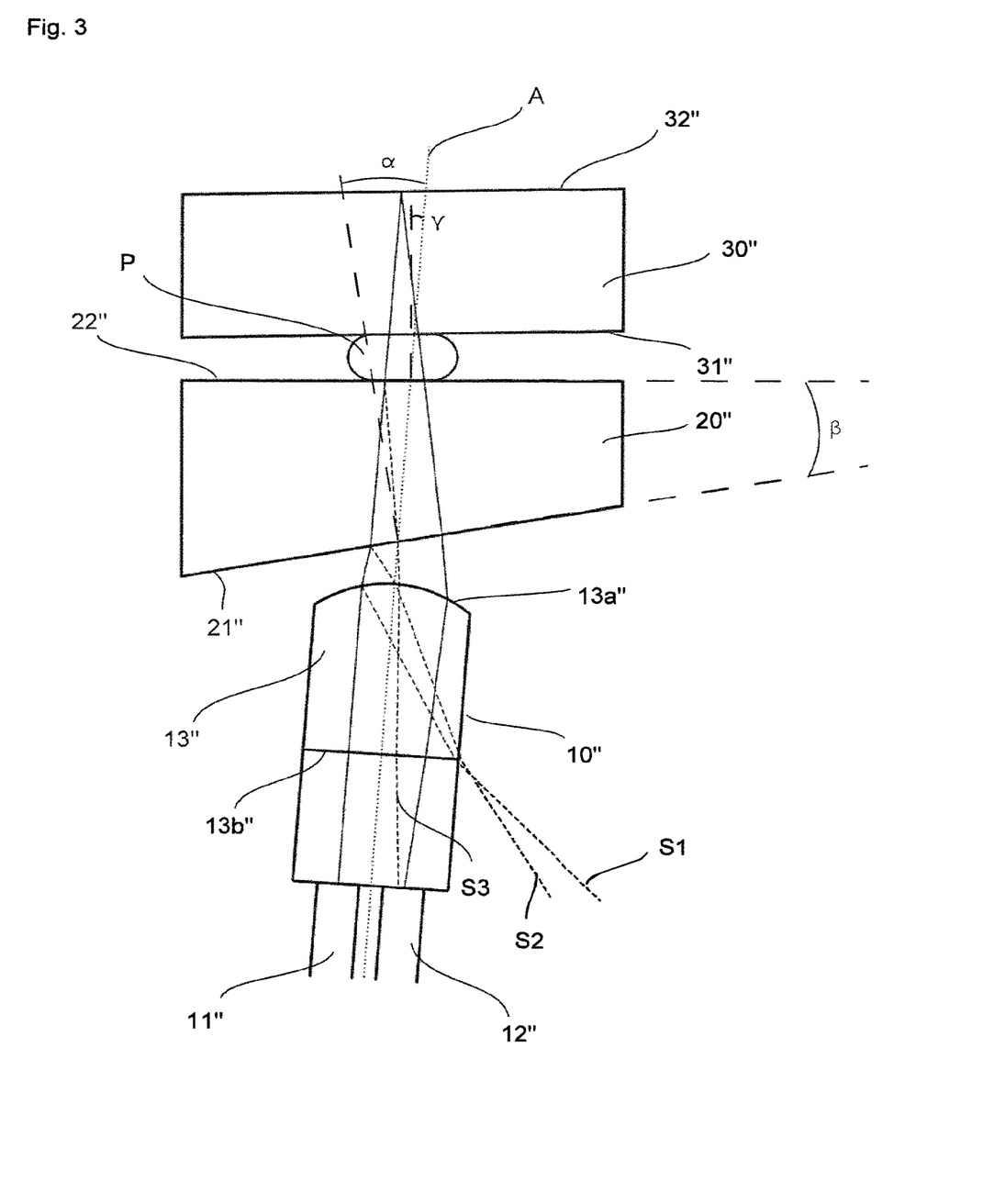
FIG. 3 shows a schematic view of a measuring head of a device for a light-spectroscopic analysis according to a third embodiment of the invention.

FIG. 3 shows a third embodiment of the invention. The design of the third embodiment essentially differs in the alignment of the measuring head 10", which is inclined at a greater angle compared to the design of the second embodiment. In addition, an inclined surface 21" of a sample holder 20" of the third embodiment has a greater angle relative to the plane of the receiving surface 22" compared to the device of the first and second embodiments.

The measuring head 10" of the third embodiment comprises an excitation fiber 11", a detection fiber 12" and a lens 13". The lens 13" has a curved, in particular convex lens surface 13a", through which excitation light exits the measuring head 10" toward the sample P. The excitation fiber 11" and the detection fiber 12" are here shown at a distance from the flat entry face 13b", but can also be directly coupled to the flat entry face of the lens if required. The lens 13" defines an optical axis A, which passes through the sample P. Excitation light is supplied by the excitation fiber 11", which, after irradiating the sample P, reaches the detection fiber 12". The detection fiber 12" is connected to a spectrometer, in particular a fluorescence spectrometer or a luminescence spectrometer, with which a spectrophotometric analysis can be carried out.

The excitation fiber 11" is connected to a light source, wherein the light source can be a xenon lamp, in particular a xenon flash lamp, or a laser, for example.

In the third embodiment shown in FIG. 3, the measuring head 10" is disposed below a sample holder 20", as in the previously described embodiments. The sample holder 20" has an inclined surface 21" facing the lens surface 13a", whose normal forms an angle with the optical axis A of the lens 13", and a receiving surface 22", the normal of the receiving surface 22" in this embodiment example being at an angle of 4° to the optical axis A. The inclined surface 21" has an angle of approximately 10° with respect to the plane of the receiving surface 22". The receiving surface 22" is adapted to receive a liquid sample P and to hold it within a defined area.

On the side of the sample holder 20" opposite to the measuring head 10", a mirror 30" with an entry face 31" is disposed which reflects light emitted by the measuring head 10" back to the measuring head 10". The mirror can be inclined relative to the axis A in the range of 0-1° relative to the plane of the receiving surface 22".

The sample P, which in the example of the third embodiment is also a drop of liquid, is here held between the entry face 31" of the mirror 30" and the receiving surface 22" of the sample holder 20", for example by utilizing its surface tension.

The excitation light emitted by the excitation fiber 11" passes through the lens 13" and exits the measuring head 10" at the lens surface 13a". A portion of the excitation light is reflected back at the interface of the lens surface 13a". This scattered light portion is referred to as scattered light S1. The scattered light S1 essentially exits the measuring head 10" in such a way that the scattered light S1 does not reach the detection fiber.

A portion of the light passing through the lens surface 13a" is reflected on the inclined surface 21" of the holder in such a way that this light portion is directed into the measuring head 10". This scattered light portion is called scattered light S2. The scattered light S2 essentially does not reach the detection fiber 12 and is therefore not detected.

The portion of the excitation light entering the holder 20" is transmitted to the sample P, the light exiting the holder 20" at the receiving surface 22" being partially reflected. The reflected light portion is referred to as scattered light S3. Most of the scattered light S3 reaches the detection fiber 12". In view of the transition from glass to water at the receiving surface 22", which represents an interface, the strength of the reflection is significantly reduced compared to a glass-to-air transition. For this reason alone, the influence of the scattered light S3 is quite low.

The portion of the excitation light that is transmitted to the sample P passes through the sample (wherein the sample is excited) and is subsequently reflected on the mirror 30". The reflected light passes again through the sample P (re-excitation) and through the holder 20" and is coupled into the lens 13". From the lens 13", the light reaches the detection fiber 12" and can be routed from there to a spectrometer.

Figure 4:
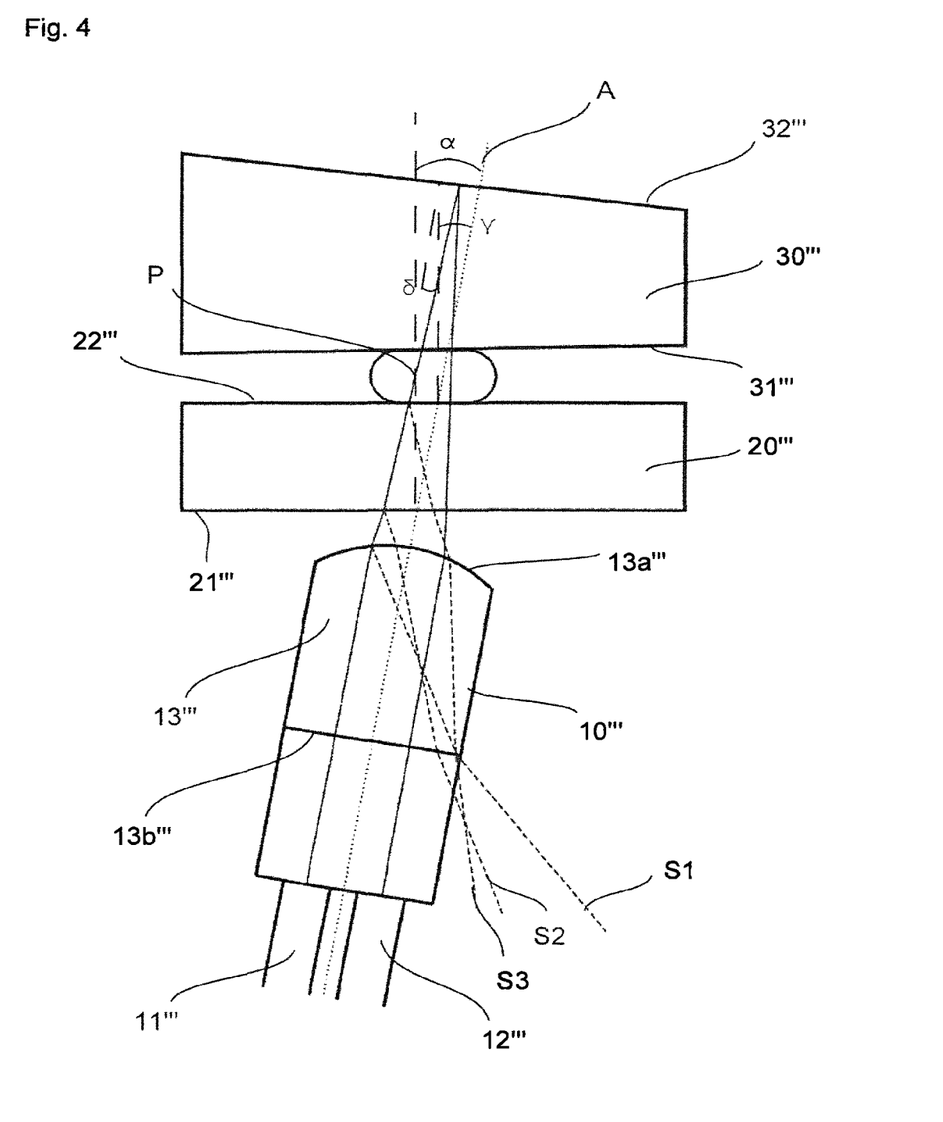
FIG. 4 shows a schematic view of a measuring head of a device for a light-spectroscopic analysis according to a fourth embodiment of the invention.

FIG. 4 shows a fourth embodiment of the invention, which differs from the first embodiment essentially in that, in the fourth embodiment example, the rear side 32''' of the mirror represents an inclined reflection surface rather than the inclined surface of the sample holder.

The measuring head 10''' of the fourth embodiment comprises an excitation fiber 11''', a detection fiber 12''' and a lens 13'''. The lens 13''' has a curved, especially convex lens surface 13a''', through which excitation light exits the measuring head 10''' toward the sample P.

The excitation fiber 11''' and the detection fiber 12''' are shown at a distance from the flat entry face 13b''', but can also be directly coupled to the flat entry face of the lens if required. The lens 13''' defines an optical axis A, which passes through the sample P. Excitation light is supplied by the excitation fiber 11''', which, after irradiating the sample P, reaches the detection fiber 12'''. The detection fiber 12''' is connected to a spectrometer, in particular a fluorescence spectrometer or a luminescence spectrometer, with which a spectrophotometric analysis can be carried out.

The excitation fiber 11''' is connected to a light source, wherein the light source can be a xenon lamp, in particular a xenon flash lamp, or a laser, for example.

As in the previously described embodiments, the measuring head 10''' of the fourth embodiment is disposed below a sample holder 20'''. The sample holder 20''' comprises an entry face 21''' facing the lens surface 13a''', which is disposed parallel or substantially parallel to a plane of a receiving surface 22''' of the sample holder 20'''.

In this embodiment example, a liquid sample P is received on the receiving surface 22''' and is held within a defined area. The sample P is held between the entry face 31''' of the mirror 30''' and the receiving surface 22''' of the sample holder 20''', for example by utilizing its surface tension.

A mirror 30''' with an entry face 31''' is disposed on the side of the sample holder 20''' opposite the measuring head 10''', which reflects on a rear side 32''' a light emitted by the measuring head 10''' back to the measuring head 10'''. The rear side 32''' of the mirror is inclined relative to the plane of the entry face 31''' of the mirror 30'''.

The excitation light emitted by the excitation fiber 11''' passes through the lens 13''' and exits the measuring head 10''' at the lens surface 13a'''. A portion of the excitation light is reflected back at the interface of the lens surface 13a'''. This scattered light portion is referred to as scattered light S1. The scattered light S1 essentially exits the measuring head 10''' in such a way that the scattered light S1 does not reach the detection fiber.

A portion of the light passing through the lens surface 13a''' is reflected on the inclined surface 21''' of the holder. This scattered light portion is called scattered light S2. The scattered light S2 essentially does not reach the detection fiber 12''' and is therefore not detected.

The portion of the excitation light entering the holder 20''' is transmitted to the sample P, the light exiting the holder 20''' at the receiving surface 22''' being partially reflected. The reflected light portion is referred to as scattered light S3. The scattered light S3 essentially does not reach the detection fiber 12''' and is therefore not detected.

The portion of the excitation light that is transmitted to the sample P passes through the sample (wherein the sample is excited) and is subsequently reflected on the mirror 30'''. The reflected light passes again through the sample P (re-excitation) and through the holder 20''', and is coupled into the lens 13''. From the lens 13''', the light reaches the detection fiber 12''' and can be routed from there to a spectrometer.

Figure 5:
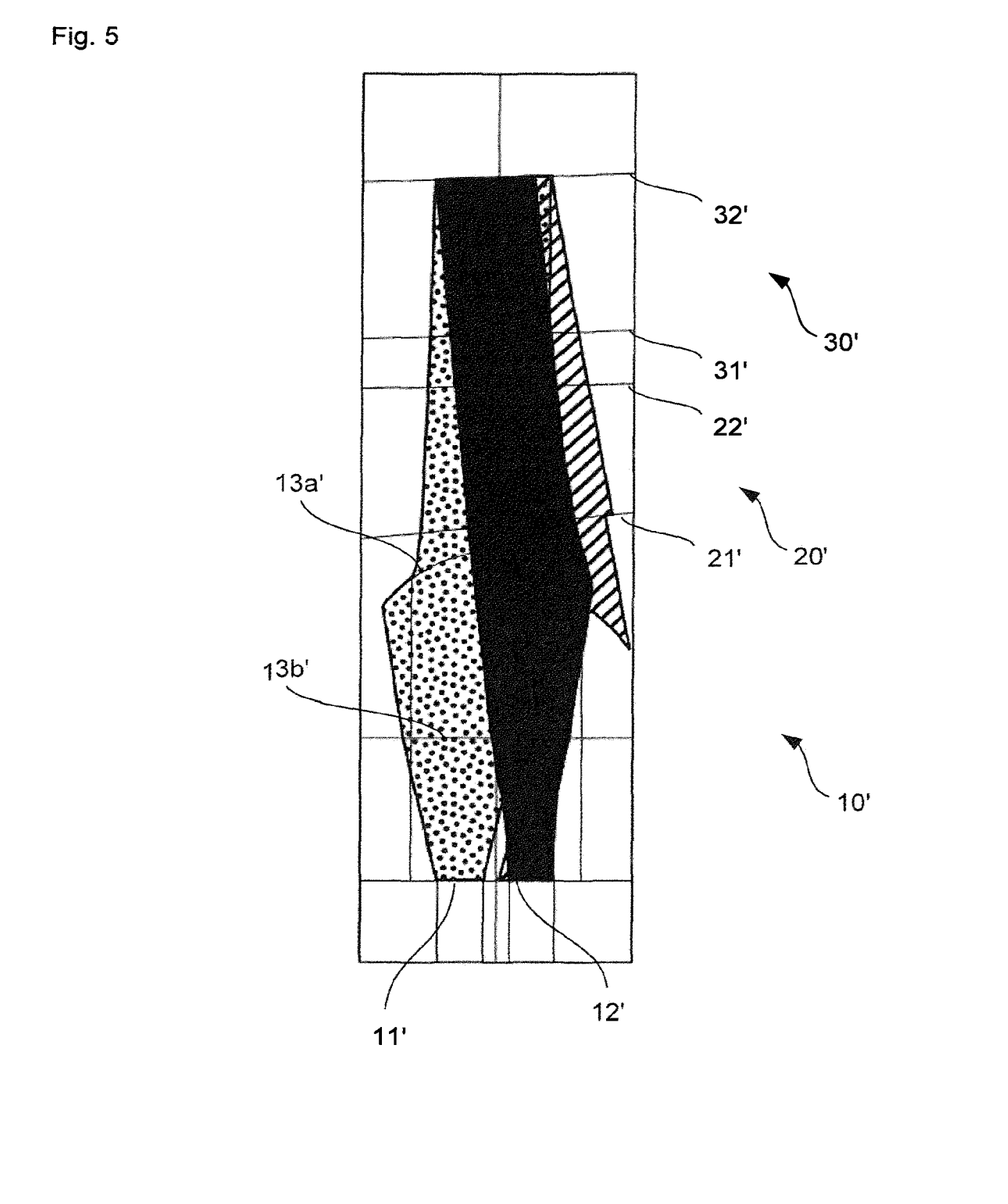
FIG. 5 shows a beam path of a light introduced by a measuring head according to the second embodiment of the invention.

FIG. 5 illustrates the beam path of the device according to the second embodiment. The dotted background shading in FIG. 5 shows the beam from the fiber to the mirror (without reflections). In particular, it can be seen how excitation light is coupled through the excitation fiber 11' via the flat rear side 13b' of the measuring head lens into the lens 13' of the measuring head 10' and exits through the curved lens surface 13a' of the measuring head.

After the excitation light exits the curved lens surface 13a', it strikes the inclined surface 21' of the sample holder 20' and is transmitted through the sample holder. At the receiving surface 22' of the sample holder 20', the excitation light exits the sample holder 20' and passes along the beam path through the sample received by the sample holder 20'. Subsequently, the light beams (which now contain, among other things, a signal light resulting from the excitation of the sample) enter the mirror 30' (entry face 31') and are reflected on the rear side 32' of the mirror 30'. The further course of the beam path takes place in a correspondingly reversed order, so that the light beams again pass through the sample received by the holder 20' and are directed via the curved lens surface 13a' toward the detection fiber 12'.

Measurements have shown that the alignment of the inclined surface 21' of the holder 20' has a large influence on the occurrence of scattered light reaching the detection fiber.

Figure 6:
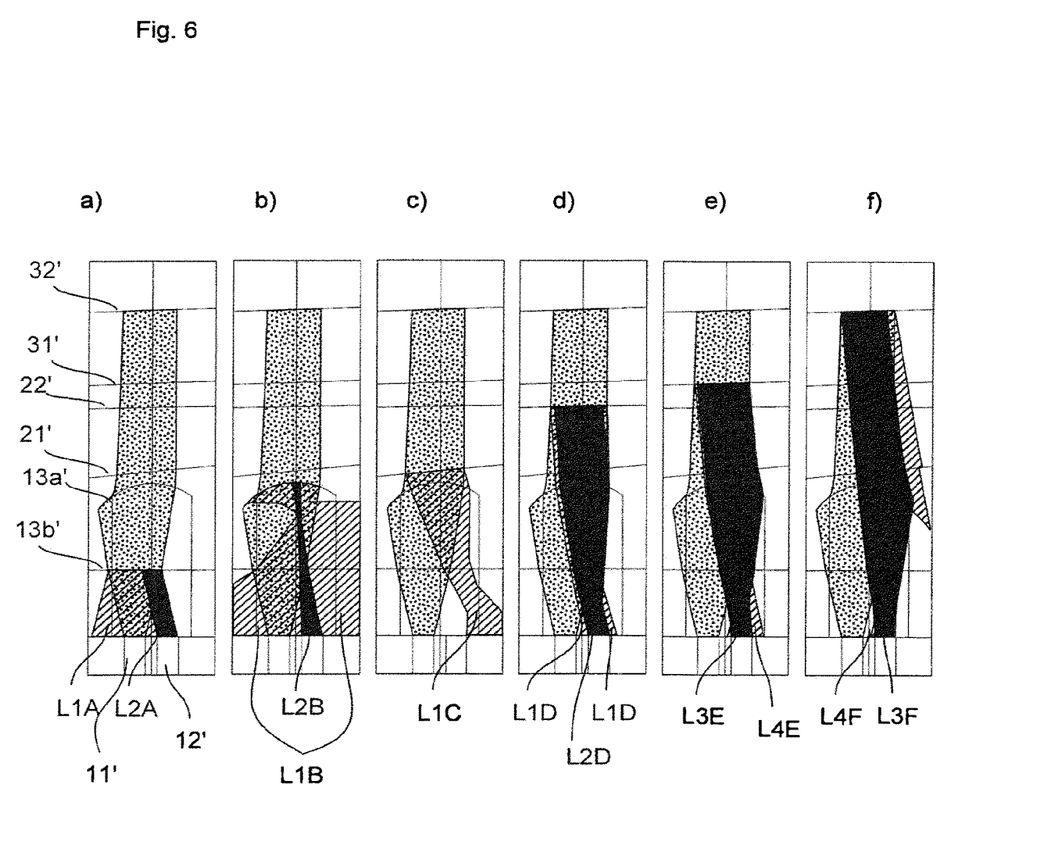
FIG. 6 shows analyses for the evaluation of scattered light in different areas of the beam path in a device according to the second embodiment of the invention.
Figure 7:
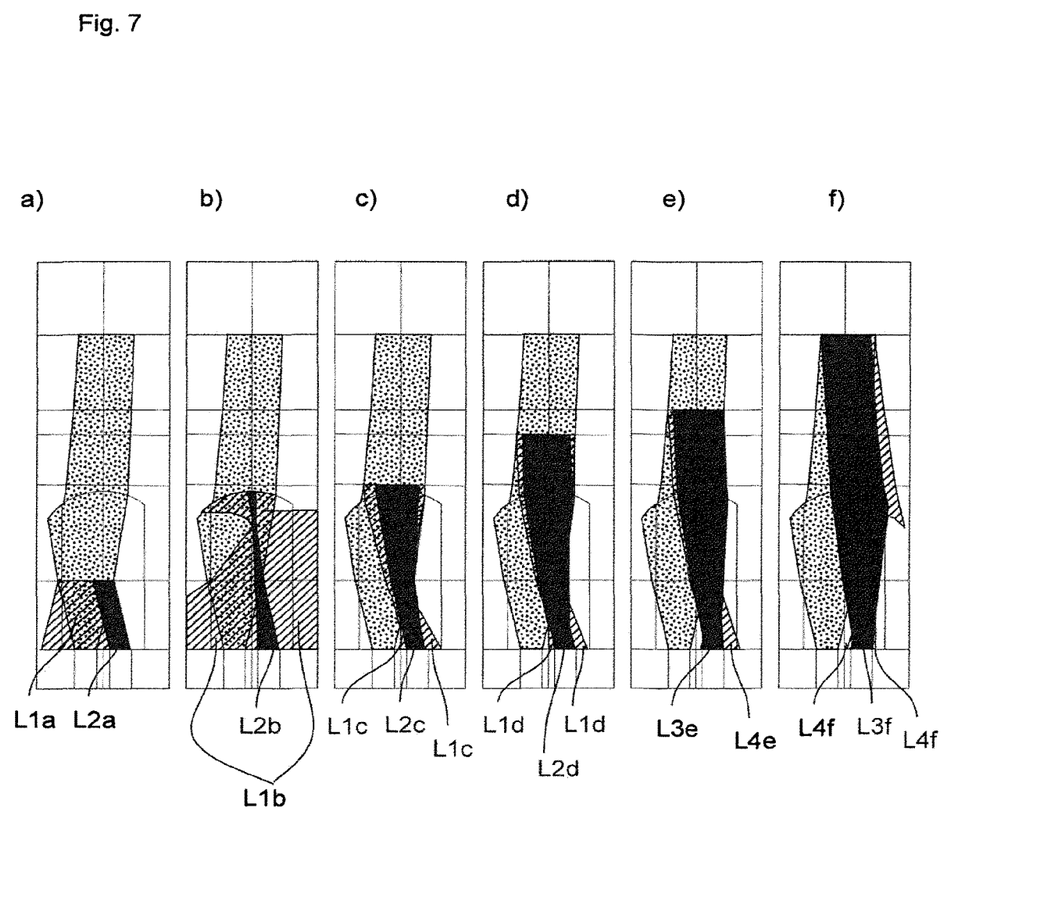
FIG. 7 shows analyses for the evaluation of scattered light in different areas of the beam path in a conventionally designed device.

Based on FIGS. 6 and 7, a device according to the invention is compared with a conventional device in order to show different scattered light portions and their effect on the measurement result. The individual partial views show the beam paths described in more detail below, the excitation and detection fibers and the interfaces of the various optical components. These components for FIG. 6 correspond to those shown in FIG. 2. Partial view f) in FIG. 6 corresponds to the view in FIG. 5.

Partial view a) in FIG. 6 shows the scattered light occurring on the flat rear side 13b' of the measuring head lens, illustrating the scattered light portion L2A that is directed to the detection fiber 12' and the scattered light portion L1A that is not directed to the detection fiber 12'. The scattered light portion L2A of the scattered light directed to the detection fiber 12' causes adverse effects (so-called "ghost images"). In the comparative example (FIG. 7), partial view a) also shows the scattered light portion L2a that is directed to the detection fiber and the scattered light portion L1a that is not directed to the detection fiber.

Partial view b) in FIG. 6 accordingly shows the scattered light occurring on the curved, convex lens surface 13a' of the measuring head, illustrating the scattered light portion L2B that is directed to the detection fiber 12' and the scattered light portion L1B that is not directed to the detection fiber 12'. Partial view b) of FIG. 7 likewise shows the scattered light portion L2b that is directed to the detection fiber and the scattered light portion L1b that is not directed to the detection fiber.

In a corresponding manner, partial view c) of FIG. 6 shows the scattered light occurring on the inclined surface 21' of the holder 20', with partial view c) of FIG. 6 containing essentially only a scattered light portion L1C which is not directed to the detection fiber 12'.

A comparison of the partial views c) of FIGS. 6 and 7 shows that the arrangement according to the invention (FIG. 6) can significantly reduce the scattered light portion directed to the detection fiber 12' or essentially results in no scattered light portion reaching the detection fiber. In contrast, the scattered light portion L2c in FIG. 7c) reaching the detection fiber is very pronounced (compared to the scattered light portion L1c not reaching the detection fiber).

In the partial view d) of FIGS. 6 and 7, scattered light portions are represented by reflection at the receiving surface 22' of the sample holder 20'. In particular, partial view d) of FIG. 6 shows a scattered light portion L1D that is not directed to the detection fiber 12' and a scattered light portion L2D that is directed to the detection fiber 12'. FIG. 7 also shows a scattered light portion L1d that is not directed to the detection fiber and a scattered light portion L2d that is directed to the detection fiber.

Partial view e) of FIGS. 6 and 7 shows a signal light L4E (FIG. 6) and L4e (FIG. 7) that is reflected on the entry face 31' of the mirror 30' but not captured by the detection fiber 12' and a signal light L3E (FIG. 6) and L3e (FIG. 7) that is captured by the detection fiber 12'.

Partial view f) of FIGS. 6 and 7 shows a signal light L4F (FIG. 6) and L4f (FIG. 7) that is reflected on the rear side 32' of the mirror 30' and not captured by the detection fiber 12' and a signal light L3F (FIG. 6) and L3f (FIG. 7) that is captured by the detection fiber.

The invention claimed is:

1. Device for a light-spectroscopic analysis, comprising:
   a sample holder defining a sample receiving surface on a first side extending horizontally, and an inclined surface on a second side, opposite the first side, the inclined surface extending along a plane at a non-zero angle relative to the sample receiving surface;
   a mirror having an entry face on a first side, adjacent the sample receiving surface, and a reflective surface disposed on a second side opposite the first side of the mirror;
      wherein the sample receiving surface of the sample holder and the entry face of the mirror are supported in a spaced apart relationship to both contact a drop of a first liquid sample, and retain the drop of the first liquid sample therebetween; and
   a measuring head disposed adjacent the inclined surface and configured for emitting excitation light toward the first liquid sample along an optical axis (A), and configured for receiving signal light, the excitation light passing through the first liquid sample and is reflected off of the reflective surface to pass back through the first liquid sample, and wherein the inclined surface modifies an optical pathway of both the excitation light and the signal light.

2. Device according to claim 1, wherein a normal of the inclined surface is angled at a first angle ($\alpha$) relative to the optical axis (A) of the measuring head, and wherein the plane of the inclined surface of the sample holder extends at a second angle ($\beta$) relative to the sample receiving surface, the second angle ($\beta$) being greater than 0°.

3. Device according to claim 2, wherein the second angle ($\beta$) is in a range of 2° to 45°.

4. Device according to claim 1, wherein the optical axis (A) of the measuring head forms a third angle ($\gamma$) in a range of 1° to 30° with a normal of the sample receiving surface of the sample holder.

5. Device according to claim 1, wherein the excitation light passes through the inclined surface prior to passing through the first liquid sample and is subsequently reflected off of the reflective surface back through the first liquid sample.

6. Device according to claim 5, further including a third angle ($\gamma$) defined by the optical axis (A) and a normal of the sample receiving surface, and a fourth angle (δ) defined by a normal of the reflective surface of the mirror and the normal of the sample receiving surface, and wherein a difference between the fourth angle (δ) and the third angle (γ) is in a range of 2° to 30°.

7. Device according to claim 1, wherein the entry face of the mirror extends at an angle of between 0°-1° relative to the sample receiving surface.

8. Device according to claim 1, wherein the measuring head, viewed vertically, is positioned below the sample holder.

9. Device according to claim 1, further comprising an excitation fiber and a detection fiber coupled to the measuring head, wherein excitation light is supplied through the excitation fiber and returns to the detection fiber after irradiating the sample holder.

10. Device according to claim 1, wherein the measuring head comprises a lens.

11. Device according to claim 1, further comprising a fluorescence spectrometer or a luminescence spectrometer.

12. Device according to claim 1, further comprising a second sample holders including a second sample receiving surface for receiving a second liquid sample, different from the first liquid sample, and wherein the measuring head is moveable and configured for emitting excitation light toward, and receiving signal light from, one of the first liquid sample and the second liquid sample.

13. Device according to claim 1, further comprising a light source for providing the excitation light for the measuring head, wherein the light source comprises a xenon flash lamp.

14. Device according to claim 3, wherein the second angle (β) is in a range of 3° to 7°.

15. Device according to claim 14, wherein the second angle (β) is 5°.

16. Device according to claim 4, wherein the third angle (γ) is in a range of 1° to 3°.

17. Device according to claim 16, wherein the third angle (γ) is 1°.

18. Device according to claim 6, wherein the difference between the fourth angle (δ) and the third angle (γ) is in a range of 2° to 4°.

19. Device according to claim 18, wherein the difference between the fourth angle (δ) and the third angle (γ) is 2°.

20. Device according to claim 2, wherein the first angle (α) is in a range of 2°-75°.

21. Device for a light-spectroscopic analysis, comprising:
a sample holder defining a sample receiving surface on a first side extending horizontally, and an entry face on a second side, opposite the first side and disposed parallel or substantially parallel to a plane of the sample receiving surface;
a mirror having an entry face on a first side, adjacent the sample receiving surface, and an inclined reflective surface disposed on a second side opposite the first side of the mirror, wherein the inclined reflective surface is inclined relative to a plane of the entry face of the mirror;
wherein the sample receiving surface of the sample holder and the entry face of the mirror are supported in a spaced apart relationship to both contact a drop of a first liquid sample, and retain the drop of the first liquid sample therebetween; and
a measuring head disposed adjacent the entry face of the sample holder and configured for emitting excitation light toward the first liquid sample along an optical axis (A), and configured for receiving signal light, the excitation light passing through the first liquid sample and being reflected off of the inclined reflective surface to pass back through the first liquid sample, and wherein the inclined reflective surface modifies an optical pathway of the signal light relative to an optical pathway of the excitation light.

22. Device according to claim 21, wherein a normal of the inclined reflective surface is angled at a first angle (α) relative to the optical axis (A) of the measuring head, and wherein a plane of the inclined reflective surface of the mirror extends at a second angle (β) relative to the entry face of the mirror, the second angle (β) being greater than 0°.

23. Device according to claim 22, wherein the second angle (β) is in a range of 2° to 45°.

24. Device according to claim 21, wherein the optical axis (A) of the measuring head forms a third angle (γ) in a range of 1° to 30° with a normal of the sample receiving surface of the sample holder.

25. Device according to claim 21, wherein the excitation light passes through the entry face of the sample holder prior to passing through the first liquid sample and is subsequently reflected off of the inclined reflective surface back through the first liquid sample.

26. Device according to claim 25, further including a third angle (γ) defined by the optical axis (A) and a normal of the sample receiving surface, and a fourth angle (δ) defined by a normal of the inclined reflective surface of the mirror and the normal of the sample receiving surface, and wherein a difference between the fourth angle (δ) and the third angle (γ) is in a range of 2° to 30°.

27. Device according to claim 21, wherein the entry face of the mirror extends at an angle of between 0°-1° relative to the sample receiving surface.

28. Device according to claim 21, wherein the measuring head, viewed vertically, is positioned below the sample holder.

29. Device according to claim 21, further comprising an excitation fiber and a detection fiber coupled to the measuring head, wherein excitation light is supplied through the excitation fiber and returns to the detection fiber after irradiating the sample holder.

30. Device according to claim 21, wherein the measuring head comprises a lens.

31. Device according to claim 21, further comprising a fluorescence spectrometer or a luminescence spectrometer.

32. Device according to claim 21, further comprising a second sample holder, including a second sample receiving surface for receiving a second liquid sample, different from the first liquid sample, and wherein the measuring head is moveable and configured for emitting excitation light toward, and receiving signal light from, one of the first liquid sample or the second liquid sample.

33. Device according to claim 21, further comprising a light source for providing the excitation light for the measuring head, wherein the light source comprises a xenon flash lamp.

34. Device according to claim 23, wherein the second angle (β) is in a range of 3° to 7°.

35. Device according to claim 34, wherein the second angle (β) is 5°.

36. Device according to claim 24, wherein the third angle (γ) is in a range of 1° or 3°.

37. Device according to claim 36, wherein the third angle (γ) is 1°.

38. Device according to claim 26, wherein the difference between the fourth angle (δ) and the third angle (γ) is in a range of 2° to 4°.

39. Device according to claim 38, wherein the difference between the fourth angle (δ) and the third angle (γ) is 2°.

40. Device according to claim 22, wherein the first angle (α) is in a range of 2°-75°.

* * * * *